US009229729B2

(12) United States Patent
Sanner, III et al.

(10) Patent No.: US 9,229,729 B2
(45) Date of Patent: Jan. 5, 2016

(54) INITIALIZING PROCESSOR CORES IN A MULTIPROCESSOR SYSTEM

(71) Applicant: INTERNATIONAL BUSINESS MACHINES CORPORATION, Armonk, NY (US)

(72) Inventors: David Dean Sanner, III, Rochester, MN (US); Jeshua Daniel Smith, Austin, TX (US); Gregory Scott Still, Research Triangle Park, NC (US); Alwood Patrick Williams, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 13/685,699

(22) Filed: Nov. 26, 2012

(65) Prior Publication Data
US 2014/0149727 A1    May 29, 2014

(51) Int. Cl.
*G06F 9/44* (2006.01)
(52) U.S. Cl.
CPC ............ *G06F 9/4405* (2013.01); *G06F 9/4403* (2013.01); *G06F 9/4401* (2013.01)
(58) Field of Classification Search
CPC .... G06F 9/4405; G06F 9/4403; G06F 9/4401
USPC ........................................................ 713/1, 2
See application file for complete search history.

(56) References Cited

U.S. PATENT DOCUMENTS

| 7,328,334 | B2 | 2/2008 | Su et al. | |
|---|---|---|---|---|
| 2004/0073633 | A1* | 4/2004 | Eduri et al. | 709/220 |
| 2006/0010312 | A1* | 1/2006 | Sugimori | 713/1 |
| 2007/0283137 | A1* | 12/2007 | Ueltschey et al. | 713/1 |

FOREIGN PATENT DOCUMENTS

JP         2000-187533         7/2000

* cited by examiner

*Primary Examiner* — Jaweed A Abbaszadeh
*Assistant Examiner* — Gary Collins
(74) *Attorney, Agent, or Firm* — Eustace P. Isidore; Yudell Isidore PLLC

(57) ABSTRACT

A system and computer program product for initializing processor cores in a multiprocessor system. The system includes a microcontroller that initializes a first processor utilizing a common initialization image for all processor cores within the first processor. The first processor detects and executes system firmware. All remaining processors are initialized utilizing the common initialization image. The executing firmware detects a system configuration of the multiprocessor system. A customized processor initialization image for each of the processor cores in the multiprocessor system is generated and stored to a storage device. The processor cores are triggered to enter a power save state in which all initialization settings of the processor cores are lost. In response to all the processor cores entering the power save state, the first processor core of the first processor is re-initialized using a first customized initialization image generated for the first processor core.

20 Claims, 7 Drawing Sheets

INITIALIZING PROCESSOR CORES IN A MULTIPROCESSOR SYSTEM

BACKGROUND

1. Technical Field

The present invention generally relates to data processing systems. More specifically, the present invention relates to initializing processor cores in a multiprocessor data processing system.

2. Description of the Related Art

Some data processing systems are designed with multi-core processors that often have various custom settings, data and parameters that prompt the processor to perform or function in a specific desired manner according to a specific user application. For example, in a multi-core processor, certain instructions might not be implemented directly in the core, but instead are emulated by microcode or firmware executing on the core. In another example, two different implementations of similar logic may be present that result in different performance depending on the number of cores or the number of processors in the system.

It is sometimes desirable to be able to modify the settings, data and parameters of a multi-core processor. In some computer systems, a service processor can be used to update the settings and parameters. However, not all systems are designed with a service processor, and as such, those systems do not typically support field updates of the settings and parameters in the computer systems.

BRIEF SUMMARY

Disclosed are a system and a computer program product for initializing processor cores in a multiprocessor system.

The data processing system includes at least one storage device having stored therein a system firmware; a multiprocessor system in communication with the storage device, the multiprocessor system having a plurality of processors each having one or more processor cores; and a microcontroller associated with at least a first processor of the plurality of processors and which: initializes the first processor utilizing a common initialization image for all processor cores within the first processor; triggers the first processor to initialize all remaining processors utilizing the common initialization image; and retrieves the system firmware from the storage device and provides the system firmware to the first processor; wherein the first processor executes the system firmware, which operates to: detect a set of current system configuration parameters of the multiprocessor system; generate a customized processor initialization image for each of the processor cores in the multiprocessor system; store the customized processor initialization images to a storage device; and trigger all of the processor cores to enter a power save state in which the initialization settings of each of the processor cores is lost; and the microcontroller, in response to all of the processor cores entering the power save state, re-initializes a first processor core of the first processor using a first customized initialization image generated for the first processor core.

The computer program product includes a computer readable storage device; and program code on the computer readable storage device that when executed within a first processor of a multiprocessor system having a plurality of processors each having one or more processor cores operates to: detect a system configuration of the multiprocessor system; generate a customized processor initialization image for each of the processor cores in the multiprocessor system; store the customized processor initialization images to a storage device; trigger all of the processor cores to enter a power save state in which all initialization settings of the processor cores are lost; and trigger a microcontroller associated with the processors to re-initialize a first processor core of the first processor using a first customized initialization image generated for the first processor core, wherein the microcontroller re-initializes the first processor core in response to all of the processor cores entering the power save state.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein.

DETAILED DESCRIPTION

Figure 1:
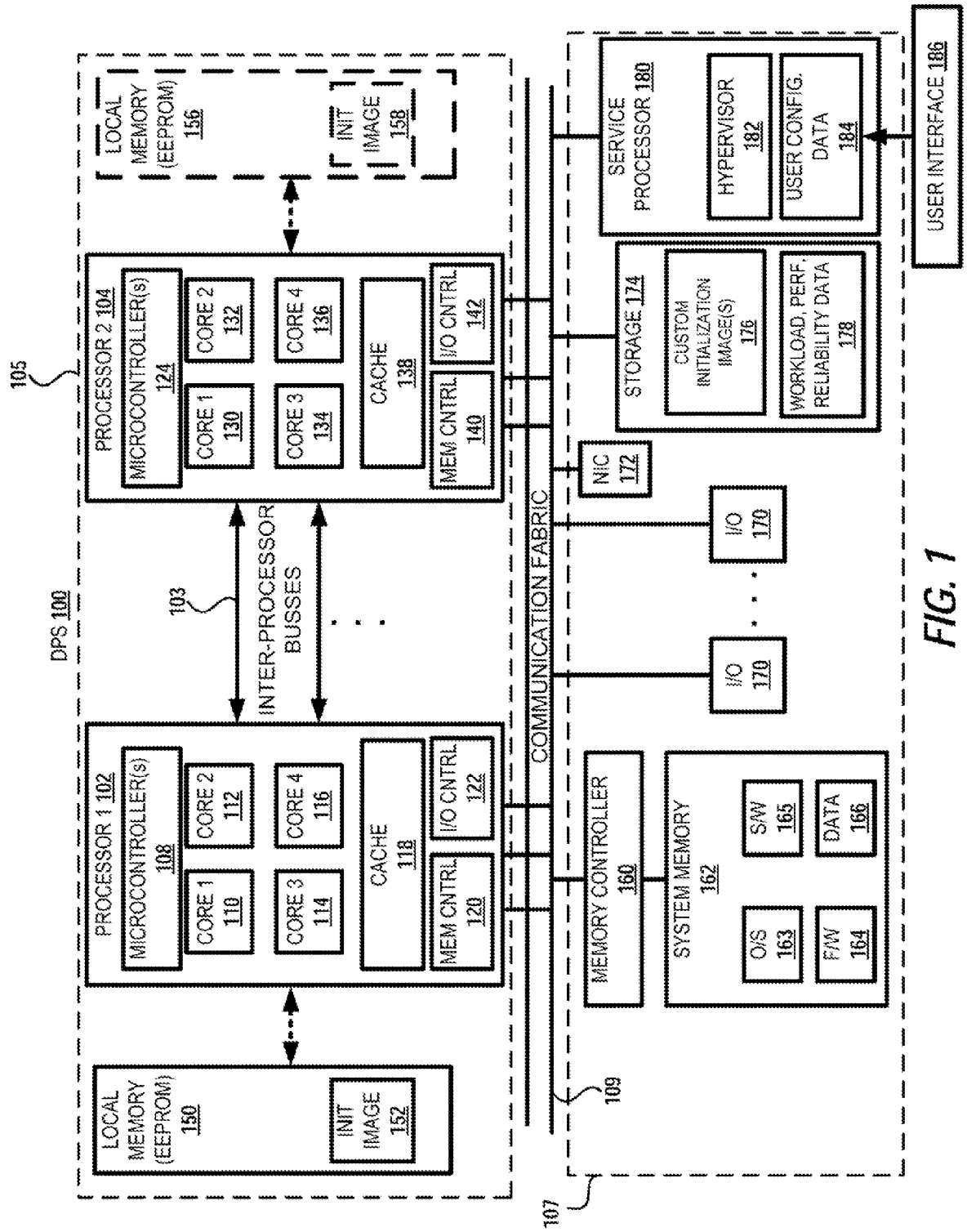
FIG. 1 provides a block diagram representation of an example data processing system within which one or more of the described embodiments can be practiced.

The illustrative embodiments provide a method, system and computer program product for initializing processor cores in a multiprocessor system. The method includes a microcontroller initializing a first processor utilizing a common initialization image for all processor cores within the first processor. The first processor detects system firmware and executes the system firmware. All remaining processors are initialized utilizing the common initialization image. The executing firmware detects and retrieves configuration information and data from the multiprocessor system. A customized processor initialization image for each of the processor cores in the multiprocessor system is generated. The customized processor initialization images are stored to a storage device. All of the processor cores are triggered to enter a power save state in which all initialization settings of the processor cores are lost. In response to all of the processor cores entering the power save state, at least the first processor core of the first processor is re-initialized using a first customized initialization image generated for the first processor core. The other processor cores are then also re-initialized utilizing their respective customized initialization images.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Those of ordinary skill in the art will appreciate that the hardware components and basic configurations depicted in FIGS. 1-5B may vary. The illustrative components within DPS 100 and DPS 200 and the other figures are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The example data processing systems depicted in FIG. 1 and FIG. 2 may be, for example, an IBM eServer pSeries system, a product of International Business Machines Corporation in Armonk, N.Y., running the Advanced Interactive Executive (AIX) operating system (Trademark of IBM Corporation) or LINUX operating system (Trademark of Linus Torvalds).

With reference now to the figures, and beginning with FIG. 1, there is depicted a block diagram representation of an example data processing system (DPS), as utilized within one embodiment. The data processing system can be described as having features common to a server computer. However, as used herein, the term "data processing system," is intended to include any type of computing device or machine that is capable of receiving, storing and running a software product and retrieving data/instructions from a storage device. Therefore the DPS can include not only computer systems, but also devices such as communication devices and personal and home consumer devices that have multiple processors and/or processor cores.

FIG. 1 and the following discussion are intended to provide a brief, general description of an exemplary data processing system adapted to implement the described embodiments. While embodiments will be described in the general context of instructions residing on hardware within a server computer, those skilled in the art will recognize that some embodiments may be implemented in a combination of program modules running in an operating system. Generally, program modules include routines, programs, components, and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example DPS 100 that comprises a multiprocessor system having processing components 105 that are in communication with system components/environment 107 through a communication fabric 109. Processing components 105 include one or more processors, represented as processing modules or chips 102 and 104. While two processors are shown in FIG. 1, processing components 105 can include more of fewer processors. Processor 1 102 includes one or more microcontroller(s) 108 and several processing units, processor cores or cores, including core 1 110, core 2 112, core 3 114 and core 4 116. Processor 1 102 also includes a cache subsystem 118. Cache subsystem 118 can comprise one or more levels of caches, such as an L1 cache and an L2 cache, and one or more of the lower levels of caches can be a shared cache. Processor 1 102 has an internal memory controller 120 and an internal I/O controller 122. All of the components of processor 102 can communication with each of the other components of processor 102.

Processor 1 102 is coupled to system interconnect or communication fabric 109, which couples other components of DPS 100 to processor 102. In one or more embodiments, communication fabric 109 can be an address and data bus. Communication fabric 109 includes specific messaging signals communicated over specific signal lines (not illustrated). Processor 1 102 can be in communication with an optional local memory or storage device 150 (indicated as optional by dashed lines). In one embodiment, local memory 150 can be an electrically erasable programmable read only memory (EEPROM). In another embodiment, local memory 150 can be a flash memory. Local memory 150 stores an optional initialization image 152 for initializing processor 1 102 during a start up sequence.

Processor 2 104, is similarly configured to processor 1 102. Processor 2 104 includes a microcontroller 124 and several processing units, processor cores, or cores, including core 1 130, core 2 132, core 3 134 and core 4 136. Processor 2 104 also includes a cache subsystem 138. Cache subsystem 138 can comprise one or more levels of caches, such as an L1 cache and an L2 cache, and one or more of the lower levels of caches can be a shared cache. Processor 2 104 has an internal memory controller 140 and an internal I/O controller 142. All of the components of processor 2 104 can communication with each of the other components of processor 2 104.

Processor 2 104 is coupled to system interconnect or communication fabric 109, which couples other components of DPS 100 to processor 2 104. Communication fabric 109 in an embodiment can be an address and data bus. Communication fabric 109 includes specific messaging signals communicated over specific signal lines (not illustrated). In one configuration, processor 2 104 can be in communication with an optional local memory or storage device 156. In one embodiment, local memory 156 can be an EEPROM. In another embodiment, local memory 156 can be a flash memory. Local memory 156 stores an optional initialization image 158 for initializing processor 104 during a start up sequence. Processors 102 and 104 can communicate with each other through one or more inter-processor busses 103. Inter-processor busses 103 allow the exchange and sharing of data and information between processor 1 102 and processor 2 104.

System components/environment 107 includes a system memory or storage device 162 coupled to communication fabric 109 via a memory controller 160. System memory 162 can include therein a plurality of modules and routines, including operating system (O/S) 163, firmware (F/W) 164, software (S/W) 165, and data 166. The various software and/or firmware modules have varying functionality when their corresponding program code is executed by processors 102 and 104 within DPS 100. DPS 100 and specifically system components 107 can also include input/output devices and corresponding controllers, generally represented as I/O 170, and a network interface card (NIC) 172, among other components. NIC 172 enables DPS 100 to connect to and communicate with other remote devices and networks.

System components 107 can further include physical computer readable storage media 174 (or storage) such as hard disk drives coupled to communication fabric 109. Storage media 174 can also include solid state storage devices, optical drives and other storage devices. Computer readable storage media 174 can store one or more customized initialization images 174 for initializing processors 102 and 104 and workload, performance, and reliability data 178. Workload performance reliability data 178 is a measure of the performance of DPS 100. A service processor 180 is coupled to communication fabric 109. Service processor 180 is responsible for various aspects of the operation of DPS 100. Service processor 180 includes a hypervisor 182, for operating one or more virtual machines within multiprocessor system 105, and user configuration data 184. User configuration data 184 allows a user to establish various parameters and settings for the operation of DPS 100. A user can provide input to user configuration data 184 through a user interface 186, such as a command line interface.

Figure 2:
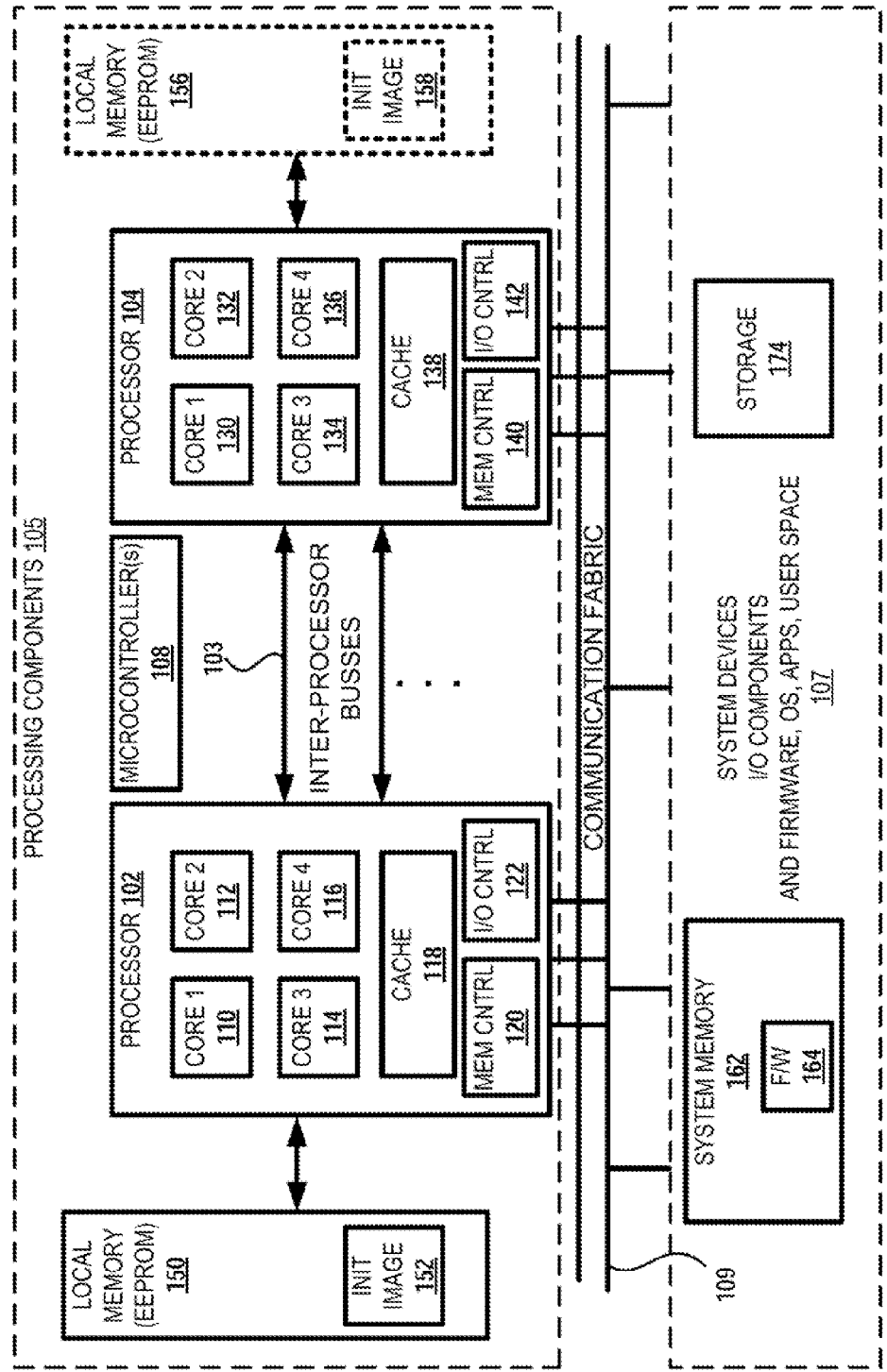
FIG. 2 provides a block diagram representation of another example data processing system within which one or more of the described embodiments can be practiced.

FIG. 2 illustrates another example data processing system DPS 200 that comprises several multiprocessor system or processing components 105 that are in communication with system devices, firmware and software 107 through a communication fabric 109. Processing components 105 include one or more processors 102 and 104, which can be referred to as processing modules or chips. While two processors are shown in FIG. 2, processing components 105 can include more or fewer processors. Processor 102 includes several processing units, processor cores or cores, core 1 110, core 2 112, core 3 114 and core 4 116. Processor 102 also includes a cache subsystem 118. Cache subsystem 118 can comprise one or more levels of caches, such as an L1 cache and an L2 cache, and one or more of the lower levels of caches can be a shared cache. Processor 102 has an internal memory controller 120 and an internal I/O controller 122. All of the components of processor 102 can communication with each of the other components of processor 102.

Processor 102 is coupled to system interconnect or communication fabric 109 that couples other components of DPS 100 to processor 102. Communication fabric 109 in an embodiment can be an address and data bus. Processor 102 can be in communication with a local memory or storage device 150. In one embodiment, local memory 150 can be an EEPROM. In another embodiment, local memory 150 can be a flash memory. Local memory 150 stores an initialization image 152 for initializing processor 102 during a start up sequence.

Processor 104 includes several processing units, processor cores or cores, core 1 130, core 2 132, core 3 134 and core 4 136. Processor 104 also includes a cache subsystem 138. Cache subsystem 138 can comprise one or more levels of caches, such as an L1 cache and an L2 cache, and one or more of the lower levels of caches can be a shared cache. Processor 104 has an internal memory controller 140 and an internal I/O controller 142. All of the components of processor 104 can communication with each of the other components of processor 104.

Processor 104 is coupled to system interconnect or communication fabric 109 that couples other components of DPS 100 to processor 104. Communication fabric 109 in an embodiment can be an address and data bus. Processor 104 can be in communication with a local memory or storage device 156. In one embodiment, local memory 156 can be an electrically erasable programmable read only memory (EEPROM). In another embodiment, local memory 156 can be a flash memory. Local memory 156 stores an initialization image 158 for initializing processor 104 during a start up sequence.

Processing components 105 further include one or more separate microcontroller(s) 108 that is separate from processors 102 and 104. Microcontroller(s) 108 can communicate with both processors 102 and 104 and with both local memories 150 and 156. More than one microcontroller can be provided, in one or more embodiments. As presented herein, the term microcontroller encompasses one or more microcontrollers to account for those embodiments. Processors 102 and 104 can communicate with each other through one or more inter-processor busses 103. Inter-processor busses 103 allow the exchange and sharing of data and information between processor 102 and processor 104.

System components 107, which include devices, I/O components, firmware O/S, applications and user space are coupled to communication fabric 109. System components 107 include a system memory or storage device 162 and computer readable storage media 174. System memory 162 can include therein a plurality of modules and routines, including firmware (F/W) 164. F/W 164 has varying functionality when the corresponding program code is executed by processors 102 and 104 within DPS 100. Computer readable storage media 174 (or storage) can include hard disk drives or solid state storage devices, optical drives and other storage devices.

Figure 3:
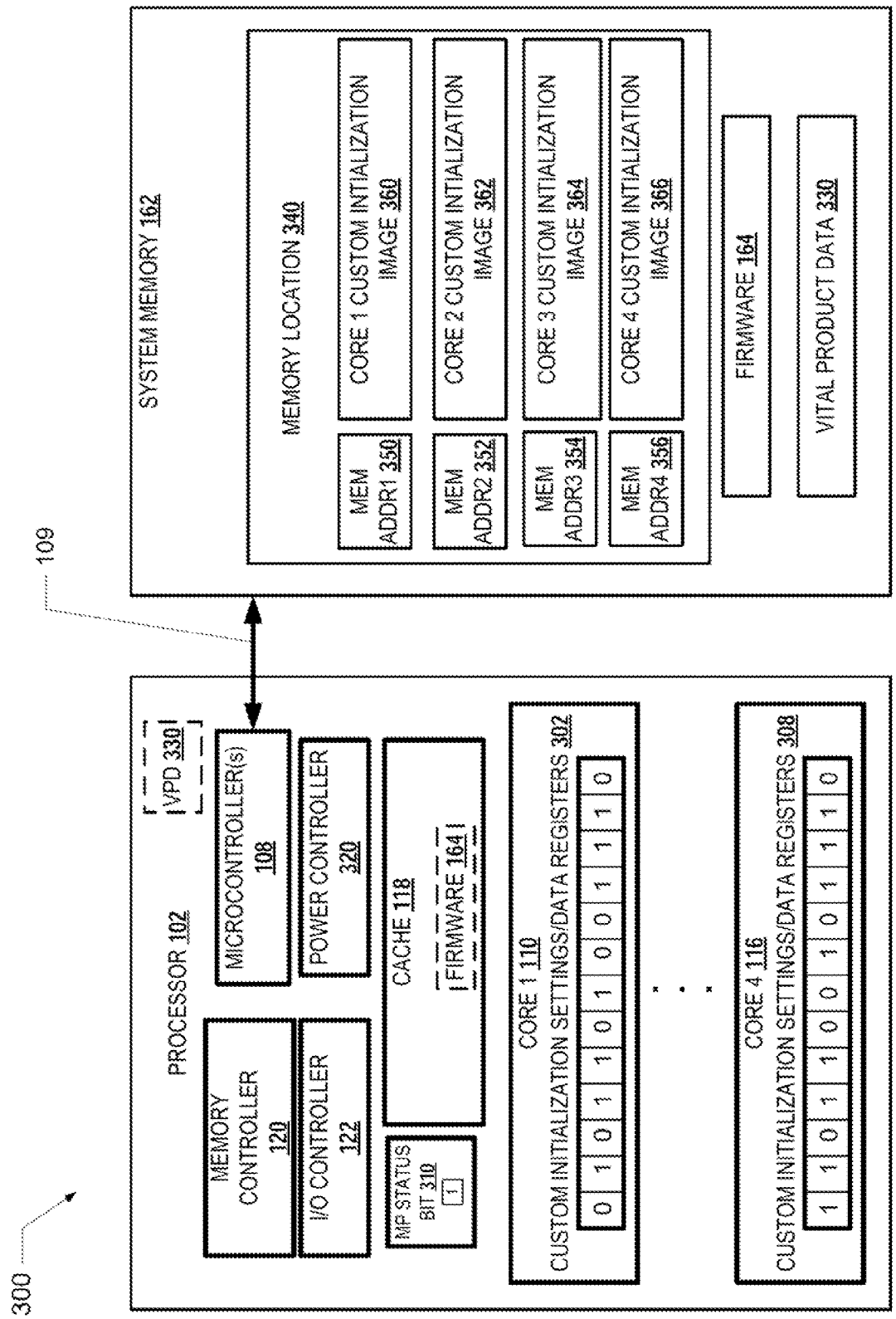
FIG. 3 illustrates a block diagram of an example processor and system memory in accordance with one or more embodiments.

With reference now to FIG. 3, there is illustrated one embodiment of a processor initialization subsystem 300. In the discussion of FIG. 3, reference is also made to elements described in FIG. 1 and FIG. 2. Processor initialization subsystem 300 includes processor 102 and system memory 162 that can be accessed by processor 102 via communication fabric 109. Processor 102 includes four processing units, processor cores or cores 110-116, of which only core 1 110 and core 4 116 are shown. Core 1 110 includes customization settings/data registers 302. Customization settings/data registers 302 are registers that contain customization initialization settings and data for core 1 110. Similarly, core 4 116 includes customization initialization settings/data registers 308. Customization settings/data registers 308 are registers that contain customization settings and data for the configuration of core 4 116. Core 2 112 and core 3 114 also include customization settings/data registers (not shown).

Processor 102 further includes a microcontroller 108 and a cache subsystem 118. Microcontroller 108 can control the operation of portions of processor 102 during start-up or initialization of the processor 102. Cache subsystem 118 can store firmware 164 for rapid access by cores 110-116 during the execution of firmware 164 within cores 110-116. Processor 102 also has an internal memory controller 120 and an internal I/O controller 122. Memory controller 120 contains the logic necessary to read and write to system memory 162. Memory controller 120 controls memory access (read/write) operations to system memory 162. I/O controller 122 controls input and output operations of data and instructions to components external to processor 102.

Processor 102 also includes a power controller 320 and a master processor status bit 310. Power controller 320 can independently control the power levels and voltages provided to components of processors 102. Power controller 320 controls the power supplied to microcontroller(s) 108 and cores 110-116. Master processor status bit 310 informs multiprocessor system 105 which processor and core are the master processor and core to be used during startup operations. In one embodiment, processor 102 can store vital product data (VPD) 330. VPD 330 is a collection of configuration and informational data associated with a particular set of hardware and software.

Processor 102 can read data/instructions/code from and write data and instructions to system memory 162 via memory controller 120 or microcontroller(s) 108. System memory 162 comprises one or more memory devices such as DRAM memory or solid state memory. System memory 162 can store custom initialization images for cores 110-116 in a memory location 340. In one or more embodiments, memory location 340 can be determined by a basic address register (BAR) (e.g., pointer 510, FIG. 5) within microcontroller(s) 108. In at least one embodiment, the firmware updates the BAR to point to memory location 340. The custom initialization images include core 1 custom initialization image 360 stored at a logical or physical memory address 1 350, core 2 custom initialization image 362 stored at a logical or physical memory address 2 352, core 3 custom initialization image 364 stored at a logical or physical memory address 3 354, and core 4 custom initialization image 366 stored at a logical or physical memory address 4 356. The custom initialization images 360-366 are used to customize cores 110-116 with customized settings and parameters during initialization. System firmware 164 which is utilized for configuring multiprocessor system 105 and vital product data (VPD) 330 is also stored on system memory 162. System firmware 164 is executed by one or more of processor cores 110-116. Functions, modules, routines, methods and processes of the present disclosure can be provided as firmware code within firmware 164.

Figure 4:
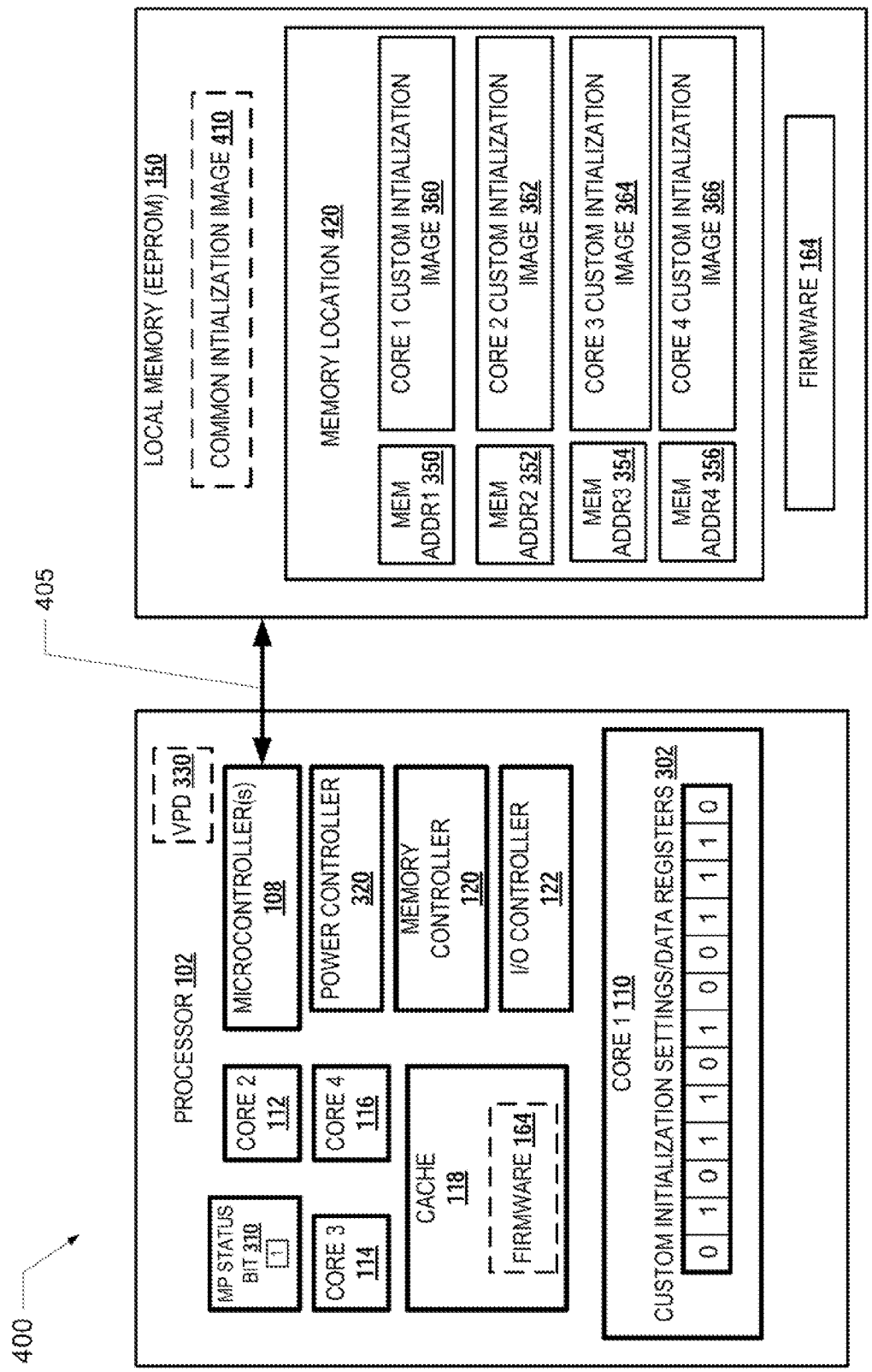
FIG. 4 illustrates a block diagram of another example processor and local memory in accordance with one or more embodiments.

With reference now to FIG. 4, there is illustrated another embodiment of a processor initialization subsystem 400. In the discussion of FIG. 4, reference is also made to elements described in FIG. 1 and FIG. 2. Processor and system memory 400 includes processor 102 and local memory 150 that can be accessed via a local bus 405. Processor 102 includes four processing units, processor cores or cores 110-116. Core 1 110 includes customization settings/data registers 302. Customization settings/data registers 302 are registers that contain custom initialization settings and data for core 1 110.

Processor 102 further includes a microcontroller(s) 108 and a cache subsystem 118. Microcontroller 108 can control the operation of portions of processor 102 during start-up or initialization of the processor. Microcontroller(s) 108 can read data and instructions from local memory 150. Cache subsystem 118 can store firmware 164 for rapid access by cores 110-116 during the execution of firmware 164 within cores 110-116. Processor 102 also has an internal memory controller 120 and an internal I/O controller 122. Memory controller 120 contains the logic necessary to read and write to local memory 150. Memory controller 120 controls memory access (read/write) operations to local memory 150. I/O controller 122 controls input and output operations of data and instructions to components external to processor 102.

Processor 102 also includes a power controller 320 and a master processor status bit 310. Power controller 320 can independently control the power levels and voltages provided to components of processors 102. Power controller 320 controls the power supplied to microcontroller(s) 108 and cores 110-116. Master processor status bit 310 informs multiprocessor system 105 which processor and core are the master processor and core to be used during the initial startup of DPS 100. In one embodiment, processor 102 can store vital product data (VPD) 330. VPD 330 is a collection of configuration and informational data associated with a particular set of hardware and software.

Processor 102 can read and write data and instructions to local memory 150 via memory controller 120 or via microcontroller(s) 108. Local memory 150 is an electrically erasable programmable read only memory (EEPROM) device. Local memory 150 can store a common initialization image 410. Common initialization image 410 is used by microcontroller(s) 108 to initialize a master processor and core such as processor 102 and core 1 110 as well as all other cores within processor 102 during an initialization procedure.

Local memory 150 can further store custom initialization images for cores 110-116 in a pre-defined memory area or location 420. The custom initialization images include core 1 custom initialization image 360 stored at a logical or physical memory address 1 350, core 2 custom initialization image 362 stored at a logical or physical memory address 2 352, core 3 custom initialization image 364 stored at a logical or physical memory address 3 354, and core 4 custom initialization image 366 stored at a logical or physical memory address 4 356. The custom initialization images 360-366 are used to customize cores 110-116 with customized settings and parameters during initialization. Local memory 150 can also store system firmware 164 for configuring multiprocessor system 105. System firmware 164 is run on or executed by one or more of processor cores 110-116. One or more of the functions, modules, routines, methods and processes of the present disclosure can be provided as firmware code within system firmware 164.

Figure 5B:
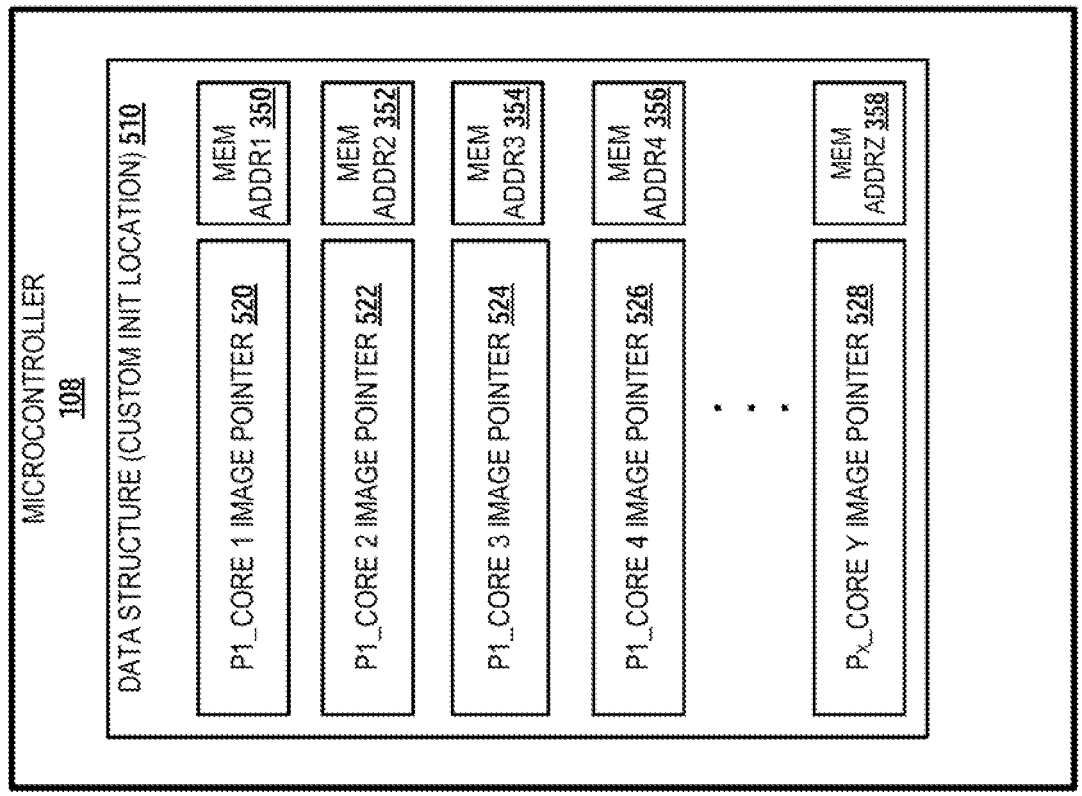
FIG. 5B illustrates a block diagram of an example microcontroller following creation of the customized initialization images in accordance with one or more embodiments.
Figure 5A:
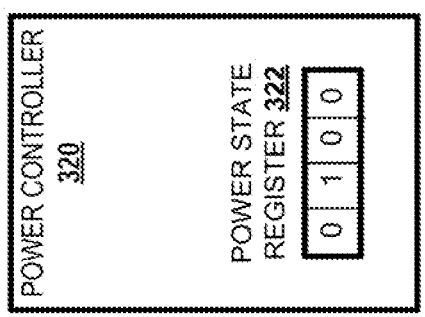
FIG. 5A illustrates a block diagram of an example power controller with a processor power state register in accordance with one or more embodiments.

FIG. 5A illustrates further details of an example power controller such as power controller 320 of FIG. 3 or FIG. 4. In the discussion of FIG. 5A, reference is also made to elements described in FIGS. 1-4. Power controller 320 controls the power supplied to microcontroller 108, cores 110-116 and other components of processor 102 through connections (not shown) internal to processer 102. Microcontroller 108 and core 110 can issue a power save command to power controller 320 that instructs power controller 320 to reduce power levels to one or more cores 110-116. According to one embodiment, power controller 320 can provide several levels of power saving states or modes to cores 110-116. For example, power controller 320 can provide a nap power state, a doze power state, a rvwinkle power state, a sleep power state, and other power states to cores 110-116. Within the described embodiments, the deep power saving state can be and/or is equivalent to the rvwinkle power state of a Power™ architecture.

The reduced power levels cause the cores targeted for power reduction to enter an appropriate one of the deep power saving states in which all initialization settings of the cores are lost. Power controller 320 also includes a power state register 322. Power state register 322 contains bits that indicate the power state of processor cores 110-116. A "1" in a register field of power state register 322 indicates that the core is powered on and in a normal operational state. A "0" in a register field of power state register 322 indicates that the core is powered down and in a power saving state in which the specific core has lost the core's initialization settings.

FIG. 5B illustrates further details of an example microcontroller such as micro-controller 108 of FIG. 3 or FIG. 4. In the discussion of FIG. 5B, reference is also made to elements described in FIGS. 1-4. Microcontroller 108 can store a pointer or data structure 510 that maps the custom initialization images to a memory address. Data structure 510 includes a processor 1 core 1 custom initialization image pointer 520 that corresponds to a logical or physical memory address 1 350 where P1C1 custom initialization image 360 (FIG. 3) is stored. Data structure 510 also includes processor 1 core 2 custom initialization image pointer 522 that corresponds to a logical or physical memory address 2 352 where P1C2 custom initialization image 362 (FIG. 3) is stored. Data structure 510 also includes processor 1 core 3 custom initialization image pointer 524 that corresponds to a logical or physical memory address 3 354 where P1C3 custom initialization image 364 (FIG. 3) is stored. Finally, processor 1 core 4 custom initialization image pointer 526 that corresponds to a logical or physical memory address 4 356 where P1C4 custom initialization image 366 (FIG. 3) is stored. Data structure 510 can contain image pointers and memory addresses up to the corresponding number of cores contained within multi-processor system 105. Data structure 510 can contain up to processor X core Y custom initialization image pointers 528 that correspond to logical or physical memory addresses Z 358, where X, Y, and Z are integers. It is appreciated that the description of data structure 510 can be extended to be equivalent to a basic address register (BAR) that is stored in microcontroller 108 and is programmed by the executing firmware to point a specific memory location.

Figure 6:
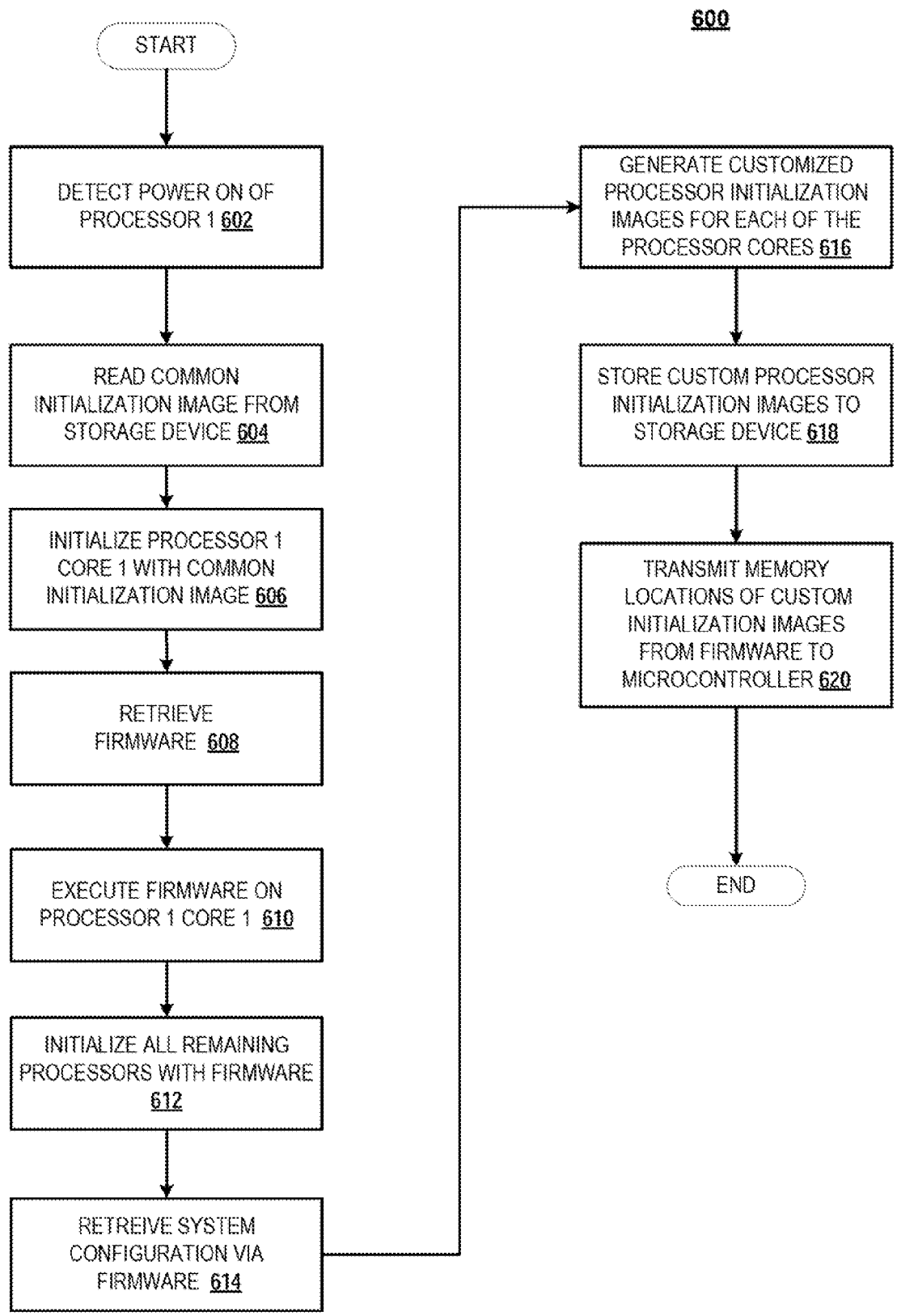
FIG. 6 is a flow chart illustrating one example of a method of generating customized initialization images during initializing of processor cores in a multiprocessor system, according to one or more embodiments.

FIG. 6 illustrates a flowchart of an exemplary process for preparing processor cores in a multiprocessor system to be initialized. Computer implemented method 600 can be implemented in DPS 100. The description of the method is provided with general reference to the specific components illustrated within the preceding figures. In the discussion of FIG. 6, reference is also made to elements described in FIGS. 1-5B. Generally the method is described as being implemented via microcontroller 108 and core 1 110 and particularly by the execution of code within microcontroller 108 and by execution of firmware 164 within core 1 110. It is however appreciated that certain aspects of the described methods may be implemented via other processing devices and/or execution of other code.

Method 600 begins at the start block and proceeds to block 602 where microcontroller 108 detects an initial powering on of processor 1 102 within DPS 100. In one embodiment, microcontroller 108 can use information contained in power state register 322 (FIG. 5A) to determine whether processor 1 102 is powering on. If microcontroller 108 detects that processor 1 102 is powering on, microcontroller 108 reads a common initialization image 152/410 stored in local memory 150 (block 604). Microcontroller 108 determines which processor and core are the master processor and core to be used at initial startup using master processor bit 310. Microcontroller 108 runs or initializes the core 1 110 of processor 1 102 (the master processor and core) with the common initialization image 152/410 (block 606). At block 608, the common initialization image 152/410 executing on microcontroller 108 retrieves system firmware 164 from system memory 162.

Core 1 110 of processor 1 102 executes firmware 164 (block 610) and initializes all of the remaining processors and cores within multi-processor system 105 with firmware 164 (block 612). The respective cores and processors within multi-processor system 105 execute firmware 164 to detect a system configuration for multi-processor system 105 at block 614. Detecting the system configuration comprises probing inter-processor I/O busses 103, local memories 150, 156 and other processing components 105.

Local memories 150, 156 and system memory 162 can be probed using serial presence detect (SPD). Serial presence detect (SPD) refers to a standardized way to automatically access information about a computer memory module. When a modern computer is turned on, the computer starts by performing a power-on self-test (POST) which includes automatically configuring the hardware currently present. SPD is a memory hardware feature that makes it possible for the computer to know what memory is present, and what timings to use to access the memory. Memory modules which support SPD can store parameters associated with the memory module in a pre-defined location. These data bytes can contain information such as timing parameters, manufacturer, serial number and other useful information about the memory module. This data allows a device utilizing the memory to automatically determine key parameters of the memory module. For example, the SPD data on a memory module might provide information about the column address strobe (CAS) latency, allowing this to be correctly set without user intervention.

Each of the processor cores 110-116 generates respective customized processor core initialization images 360-366 for their respective processor cores (block 616) and stores the customized processor core initialization images 360-366 to memory addresses 350-356 within a memory location 340, 420 of one or both of storage device 150, 162 (block 618). The memory addresses identify a location in the storage device where the customized initialization images 360-366 are maintained. At block 620, the firmware 164 executing on each of processor cores 110-116 transmits a memory location address 350-356 associated with each of the customized initialization images 360-366 to the microcontroller 108. Method 600 then ends.

Figure 7:
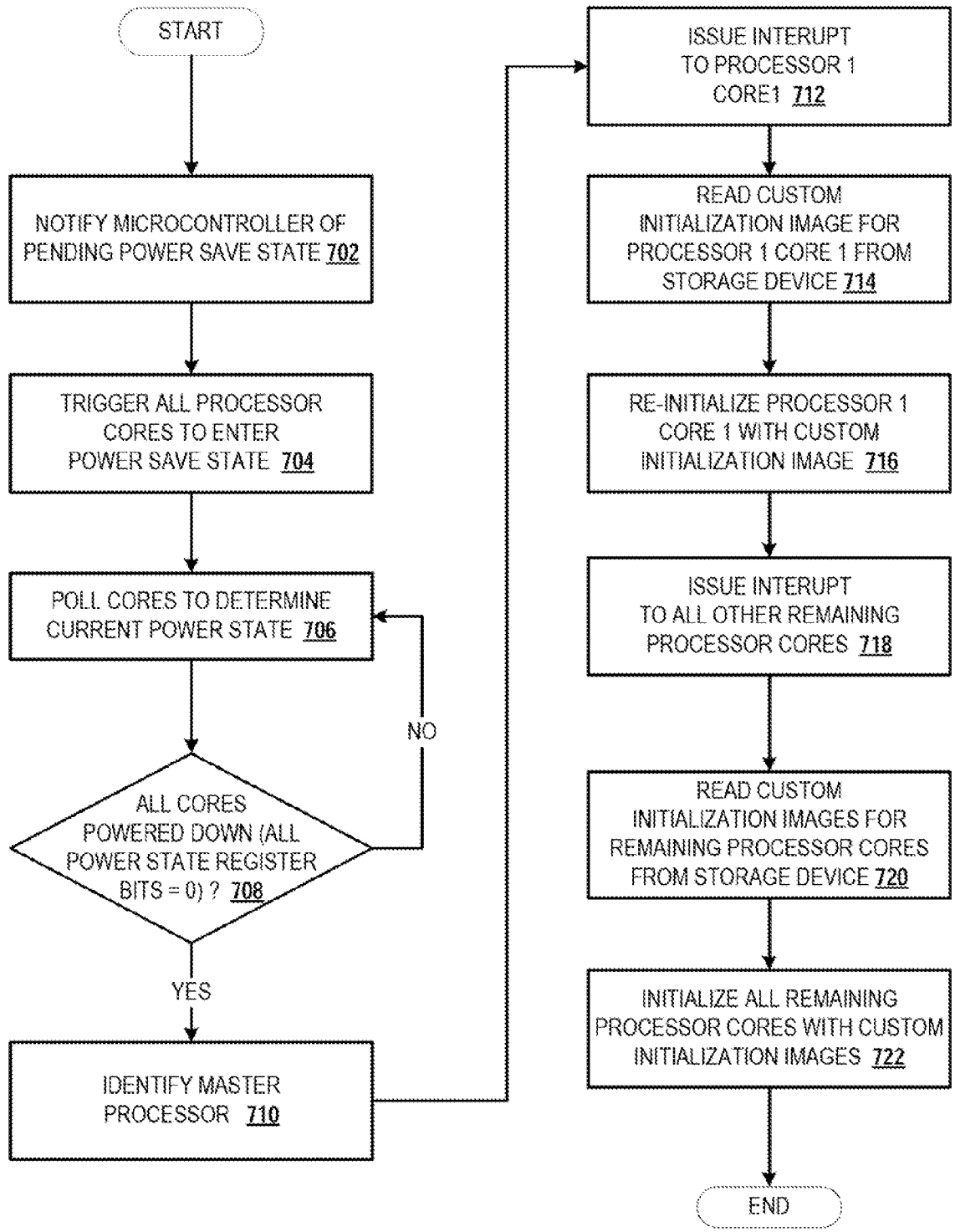
FIG. 7 is a flow chart illustrating a method of initializing processor cores with customized initialization images in a multiprocessor system, according to one or more embodiments.

FIG. 7 illustrates a flowchart of an exemplary process for initializing processor cores with customized initialization images. Computer implemented method 700 can be implemented in DPS 100. The description of the method is provided with general reference to the specific components illustrated within the preceding figures. In the discussion of FIG. 7, reference is also made to elements described in FIGS. 1-5. Generally the method is described as being implemented via microcontroller 108 or another different microcontroller (not shown) and core 1 110 and particularly by the execution of code within microcontroller 108 and by firmware 164 acting within core 1 110. It is however appreciated that certain aspects of the described methods may be implemented via other processing devices and/or execution of other code.

Method 700 begins at the start block and proceeds to block 702 where core 1 110 executing firmware 164 notifies microcontroller 108 that the processors 102 and 104 are pending entering a deep power save state. This step prepares the microcontroller 108 for when processors 102 and 104 enter a deep power save or quiescent state. Core 1 110 triggers all of the cores 110-116, 130-136 of all of the processors 102, 104 to enter a deep power save state in which all initialization settings of the processor core registers 302-308 are lost (block 704). Microcontroller 108 polls all of the processor cores to determine a current power state of each of the cores (block 706). Determining the current power state of each of the cores in block 706 can include checking the bits contained in power state register 322.

At decision block 708, microcontroller 108 determines if all of the processor cores have entered the deep power save state. In response to all of the processor cores not entering the deep power save state, microcontroller 108 continues to poll all of the processor cores to determine a current power state of each of the cores in block 706. In response to all of the processor cores entering the deep power save state, microcontroller 108 identifies a master processor and a master core in the multiprocessor system (block 710). In one embodiment, microcontroller 108 can identify the master processor and master core by checking master processor status bit 310. In one embodiment, the master processor can be processor 1 102 and the master core can be core 1 110.

Microcontroller 108 issues an interrupt to core 1 110 of processor 1 102 to wake core 1 110 from the deep power save state (block 712). Microcontroller 108 reads the respective customized initialization image 360 for core 1 110 from storage device 150, 162 (block 714). Microcontroller(s) 108 re-initializes core 1 110 of processor 102 with the core 1 customized initialization image 360 and core 1 110 reloads firmware 164 at block 716. Core 1 110 executes firmware 164 and issues an interrupt to each of the remaining processors and processor cores (e.g. processor 1 102, cores 112, 114, 116 and processor 2 104, cores 130, 132, 134 and 136) within the multiprocessor system to wake all of the cores from their deep power save states (block 718).

At block 720, microcontroller 108 reads, from the storage device 150, each remaining processor core's respective customized initialization image. Microcontroller 108 initializes each of the remaining processor cores 112-116 and 130-136 with their respective customized initialization images (block 722). Method 700 then terminates at the end block.

According to one or more embodiments, two different microcontrollers are utilized and/or implemented on the master processor. A first microcontroller performs the first set of initialization procedures for the master processor, including accessing the storage device to load the common initialization image into the master processor, loading the firmware for execution on the master processor, and then initializing the other processors using the common initialization image. The first microcontroller also responds to detecting that all processor cores have entered the power save state by sending an interrupt to wake up the master processor (or master core on the first processor). A second microcontroller then performs the second set of initialization procedures including: responding to the first processor or first processor core coming out of the power save state by retrieving the customized initialization image for the master processor (or master core) from the stored location; configuring the master processor or master core with the customized initialization image; and then retrieving the other customized initialization images for each of the other processor cores and configuring the other processors with their respective customized initialization images.

Each of the other processor cores is also awakened by the first microcontroller transmitting an interrupt to that processor core. The interrupt can be transmitted just prior to the time at which the second micro-controller is ready to load the customized initialization image for that processor core. With these embodiments, function block 712 of the above method 700 triggers the second microcontroller to prepare to perform the re-initialization processes. It is appreciated, that as described within method 700, the need for a second processor is not required, and by extension, the function block 712 can be omitted in the implementation of those embodiments.

One or more of the described embodiments provide a method for initializing processor cores in a multiprocessor system. A microcontroller initializes a first processor utilizing a common initialization image for processor cores within the first processor. The first processor detects system firmware and executes the system firmware. All remaining processors are initialized utilizing the common initialization image. The executing firmware detects a system configuration of the multiprocessor system. A customized processor initialization image for each of the processor cores in the multiprocessor system is generated. The customized processor initialization images are stored to a storage device. All of the processor cores are triggered to enter a power save state in which all initialization settings of the processor cores are lost. In response to all of the processor cores entering the power save state, at least the first processor core of the first processor is re-initialized using a first customized initialization image generated for the first processor core. The remaining processor cores are then also re-initialized with their respective customized initialization image.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system comprising:
   at least one storage device having stored therein a system firmware;
   a multiprocessor system in communication with the storage device, the multiprocessor system having a plurality of processors each having one or more processor cores; and
   a microcontroller associated with at least a first processor of the plurality of processors and which:
   initializes the first processor utilizing a common initialization image for all processor cores within the first processor, wherein the common initialization image is usable to initialize all processor cores within the first processor, and wherein the microcontroller is separate from the plurality of processors;
   triggers the first processor to initialize all remaining processors utilizing the common initialization image; and
   retrieves the system firmware from the storage device and provides the system firmware to the first processor;
   wherein the first processor executes the system firmware, which operates to:
   detect a set of current system configuration parameters of the multiprocessor system, wherein detecting the set of current system configuration parameters further comprises probing, within the multiprocessor system, at least one of: one or more inter-processor input/output (I/O) busses between the plurality of processor cores, a system memory, one or more local memories, and one or more other processing components;
   for each of the processor cores in the multiprocessor system, generate a customized processor initialization image based on the set of current system configuration parameters;
   store the customized processor initialization images to a memory location within the storage device; and
   trigger all of the processor cores to enter a power save state in which all initialization settings of all of the processor cores is lost; and
   the microcontroller, in response to detecting that all of the processor cores have entered the power save state:
   loads a first customized initialization image generated for a first processor core of the first processor from the memory location in the storage device; and
   re-initializes the first processor core using the first customized initialization image.

2. The data processing system of claim 1, wherein the microcontroller detects a powering on of the first processor and initializes the processor cores of the first processor in response to detecting the powering on.

3. The data processing system of claim 1, wherein the microcontroller:
   receives a notification from the system firmware that indicates that the processors are to be placed in the power save state;
   monitors the processors as the processors enter into the power save state;
   in response to detecting that all of the processor cores have entered the power save state: issues an interrupt to the first processor core of the first processor that wakes the first processor core, in response to detecting that all of the processor cores have entered the power save state; and
   retrieves the first customized initialization image for the first processor core of the first processor from the storage device; and
   initialize the first processor core with the first customized initialization image.

4. The data processing system of claim 3, wherein one of the microcontroller and the first processor:
   issues an interrupt to each remaining processor core within the multiprocessor system;
   detects, from the storage device, customized initialization images for each of the remaining processor cores; and
   initializes all of the remaining processor cores with their respective customized initialization images;
   wherein the microcontroller is designed with the capability to generate processor interrupts to awaken the processor cores from the power save state.

5. The data processing system of claim 1, wherein the system firmware comprises firmware instructions that cause the processor to: in response to completing the storing of the custom initialization images, transmit a storage location address associated with each of the customized initialization images to the microcontroller, wherein the storage location address identifies a location in the storage device at which the customized initialization images are maintained and wherein the system firmware further comprises firmware instructions that cause the processor to notify the microcontroller of a pending power save command prior to triggering all of the processor cores to enter a power save state.

6. The data processing system of claim 1, wherein the microcontroller:
   in response to triggering all of the processor cores to enter a power save state, continually polls all of the processor cores to determine a current power state of each of the cores; and
   triggers initialization of the first processor with its customized initialization image only responsive to all the processor cores being in a power saving state.

7. The data processing system of claim 1, wherein the microcontroller:
   identifies a master processor and a master core in the multiprocessor system; and
   , in response to detecting that all of the processor cores have entered the power save state, transmits an interrupt to the master core of the master processor.

8. The data processing system of claim 1, wherein:
   the one or more other processing components include at least one of one or more other processors and one or more other microcontrollers;
   the microcontroller controls the operation of portions of the plurality of processors during start-up or initialization; and
   the one or more local memories are probed using serial presence detect (SPD).

9. The data processing system of claim 1, wherein probing the one or more local memories further comprises detecting at least one type of memory and at least one of:
   memory timing parameters for the at least one type of memory, wherein the memory timing parameters include a column address strobe (CAS) latency of the at least one type of memory;
   a manufacturer of the at least one type of memory; and
   a serial number of each memory module of the at least one type of memory.

10. The data processing system of claim 1, wherein the common initialization image is stored in a one of a flash memory and an electrically erasable programmable read only memory (EEPROM) separate from the storage device.

11. The data processing system of claim 1, wherein the set of current system configuration parameters comprises hardware parameters in the multiprocessor system.

12. A computer program product comprising:
a computer readable storage device; and
program code on the computer readable storage device that when executed by a first processor of a multiprocessor system having a plurality of processors each having one or more processor cores operates to:
detect a system configuration of the multiprocessor system, wherein detecting the system configuration further comprises probing, within the multiprocessor system, at least one of:
one or more inter-processor input/output (I/O) busses between the plurality of processor cores, a system memory, one or more local memories, and one or more other processing components;
for each of the processor cores in the multiprocessor system, generate a customized processor initialization image based on settings and parameters identified in the system configuration for that processor core;
store the customized processor initialization images to a memory location within a storage device;
trigger all of the processor cores to enter a power save state in which all initialization images of all of the processor cores are lost; and
trigger a microcontroller associated with the processors to re-initialize a first processor core of the first processor using a first customized initialization image generated for the first processor core, wherein the device re-initializes the first processor core in response to all of the processor cores entering the power save state, wherein the microcontroller loads the first customized initialization image from the memory location in the storage device.

13. The computer program product of claim 12, wherein the microcontroller is further triggered to:
in response to detecting that all of the processor cores have entered the power save state, the microcontroller issue an interrupt to the first core of the first processor;
retrieve the first customized initialization image for the first processor core of the first processor from the storage device;
issue an interrupt to each remaining processor cores within the multiprocessor system;
retrieve, from the storage device, customized initialization images for each of the remaining processor cores; and
initialize all of the remaining processor cores with their respective customized initialization images.

14. The computer program product of claim 12, wherein the program code comprises code that executes on the first processor to:
in response to completing storing of the custom initialization images, transmit a storage location address associated with each of the customized initialization images to the microcontroller, wherein the storage location address identifies a location in the storage device at which the customized initialization images are maintained.

15. The computer program product of claim 12, wherein the microcontroller is further triggered to:
in response to triggering all of the processor cores to enter the power save state, continually poll all of the processor cores to determine a current power state of each of the cores; and
trigger initialization of the first processor only responsive to all the processor cores having the power save state as the current power state.

16. The computer program product of claim 12, further comprising program code on the computer readable storage device that when executed within the first processor operates to: notify the microcontroller of a pending power save command prior to triggering all of the processor cores to enter the power save state.

17. The computer program product of claim 12, wherein: the one or more other processing components include at least one of one or more other processors and one or more other microcontrollers; the microcontroller controls the operation of portions of the plurality of processors during start-up or initialization; and the one or more local memories are probed using serial presence detect (SPD).

18. The computer program product of claim 12, wherein probing the one or more local memories further comprises detecting at least one type of memory and at least one of: memory timing parameters for the at least one type of memory, wherein the memory timing parameters include a column address strobe (CAS) latency of the at least one type of memory; a manufacturer of the at least one type of memory; and a serial number of each memory module of the at least one type of memory.

19. The computer program product of claim 12, wherein the common initialization image is stored in a one of a flash memory and an electrically erasable programmable read only memory (EEPROM) separate from the storage device.

20. The computer program product of claim 12, wherein the system configuration comprises a configuration of hardware in the multiprocessor system.

* * * * *